July 29, 1952 F. W. OFELDT 2,605,137
SPRAY GENERATOR
Filed Dec. 26, 1946
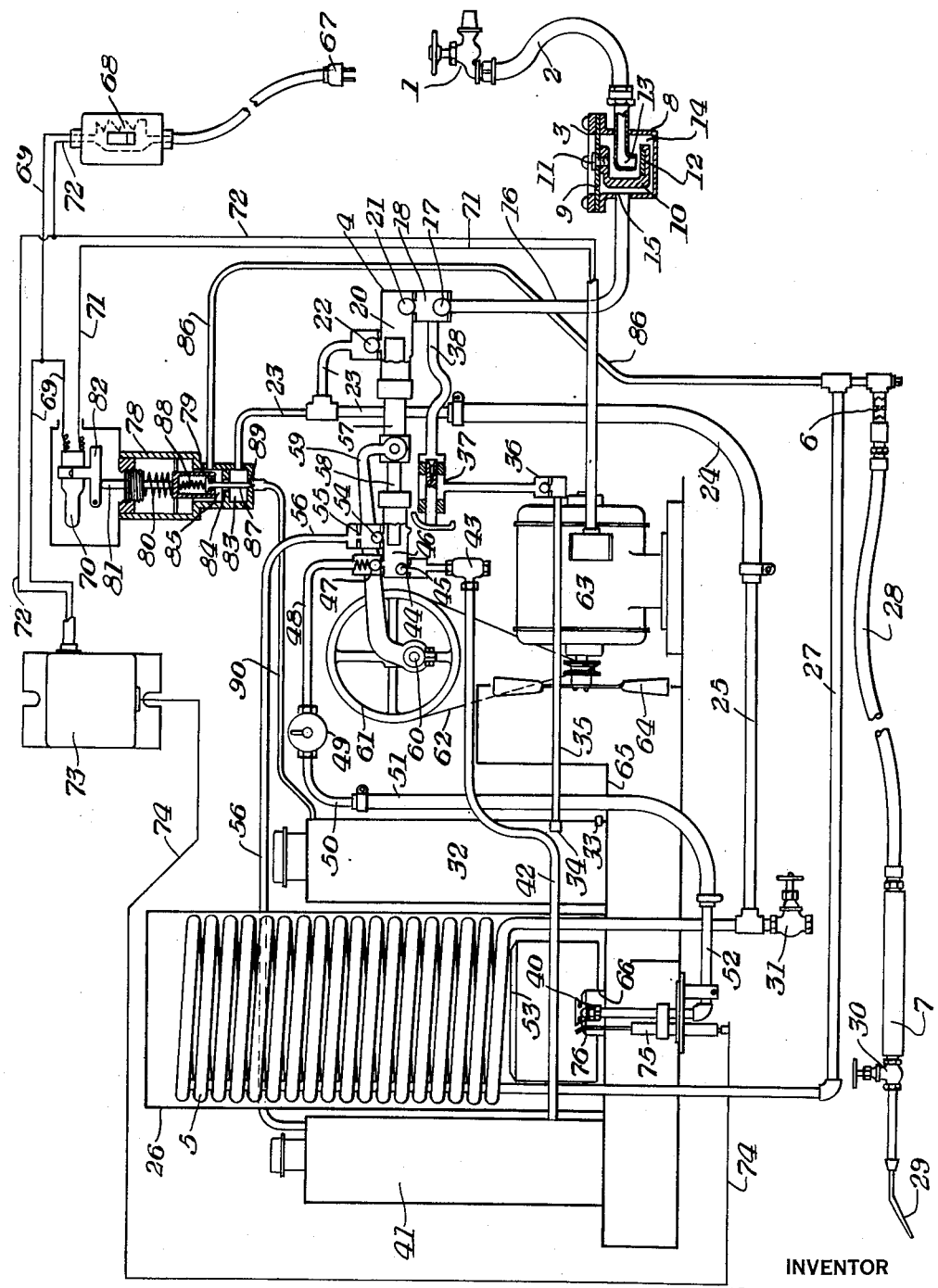
INVENTOR
FRANK W. OFELDT
BY
William D. Carothers
HIS ATTORNEY Patented July 29, 1952

2,605,137

UNITED STATES PATENT OFFICE 2,605,137

SPRAY GENERATOR

Frank W. Ofeldt, Carnot, Pa., assignor to Homestead Valve Manufacturing Company, Coraopolis, Pa., a corporation of Pennsylvania Application December 26, 1946, Serial No. 718,563

6 Claims. (Cl. 299—84)

This invention relates generally to spray generation and more particularly to the method and apparatus for controlling the generation of a spray, composed of a mixture of a liquid and a vapor of a liquid under pressure produced by heat, from a continuous supply of liquid under varying pressures.

This invention may be advantageously applied for spray cleaning and agricultural spraying wherein solutions of soap and similar cleaning compounds or solutions containing a germicide, a fungicide or an insecticide are mixed with a conveyor liquid such as water to form a solution. The solution is then heated to generate a vapor or steam under pressure and form a spray mixture composed of a liquid and the vapor of a liquid, which when discharged produces an atomized spray for the purpose of cleaning, sterilizing or spraying vegetation or other similar purpose for which the solution is intended.

In a spray generating apparatus of this character the fuel and liquid solution are supplied to the apparatus from tanks and a portion of the liquid is converted into vapor or steam for the purpose of producing a heated fluid under pressure which is sufficient to cause atomization of the mixture and the amount of vapor or steam generated is determined by correlating the amount of heat with the amount of liquid solution supplied to the appartus. The proportions of the steam or vapor to the amount of liquid in the spray mixture may be varied to produce a spray that is relatively wet. This is accomplished by varying the ratio of the correlated amounts of heat and liquid solution supplied to the apparatus in a given period of time.

The principal object of this invention is the provision of a method and apparatus for the generation of a spray mixture from a constant source of a conveyor liquid supply under varying pressures that will maintain a predetermined correlation of solution and heat supplied to the generator to produce desired proportions of liquid and the vapor of a liquid in the spray mixture.

Another object is the provision of a method and apparatus for controlling the supply of a conveyor liquid and a spray compound to form a solution for producing a spray mixture.

Another object is the provision of a method and apparatus for supplying a conveyor liquid from a continuous source of supply and a spraying compound from a limited source which are supplied and mixed to form a spray solution correlated with a supply of heat for producing a predetermined spray mixture composed of a liquid and the vapor of a liquid.

Another object is the provision of method and apparatus for supplying a compound from a limited source and a conveyor liquid which produce a spray solution to form a spray mixture by positive displacement means which cannot become air-bound when the supply of the compounds is exhausted.

Other objects and advantages will appear hereinafter in the following description and claims.

A practical embodiment illustrating the principles of this invention is shown in the accompanying drawing which is a diagrammatic view of a spray generating apparatus comprising this invention.

Referring to the spray generating apparatus shown in the drawing, the conveyor liquid is supplied from the water tap 1 connected to any suitable source of continuous supply of water and which is ordinarily subjected to varying pressures of from twenty to one hundred and fifty pounds or more. The water is conveyed through the hose 2 to the water flow regulator 3 which controls the flow of water from the tap 1 to the system of the spray generator in such a manner that the flow of water through the system is never greater than the system can handle in producing a spray mixture of liquid and vapor of a liquid. This is accomplished by utilizing the resistance of the system to regulate the flow of fluid from a supply of liquid under varying pressures. This regulator operates by virtue of the resistance of the ssytem rather than the use of springs, weights and so forth used in ordinary fluid pressure regulators. The system disclosed will produce a back pressure of approximately four to six pounds per square inch which will reduce the flow to an amount that the system can handle. Thus the design and operation of the regulator 3 is based upon the resistance to flow of the spray solution through the pump 4, the heating coils 5, the restricted orifice 6 and the spray gun 7.

The water flow regulator 3 comprises a casing 8 closed by the flexible diaphragm 9. A valve yoke 10 is suspended within the casing 8 from the diaphragm 9 to which it is attached by means of the screw 11. The yoke 10 is provided with a resilient valve seat 12 arranged to close against the mouth of the inlet pipe 13 connected to the hose 2, when the fluid pressure within the chamber 14 in the casing 8 is sufficient to expand the diaphragm 9 outwardly. The regulator is so designed that the valve seat 12 will close the inlet 13 when a pressure of from four to six pounds per square inch builds up within the chamber 14 while the water pressure in the inlet 13 may be varying in pressure from approximately twenty to one hundred and fifty pounds per square inch. The outlet 15 of the regulator 3 permits the water to flow from the chamber 14 through the pipe 16 past the check valve 17 into the mixing chamber 18 of the pump 4. The pump 4 is provided with the pump chamber 20 having an inlet check valve 21 and an outlet check valve 22. The water may proceed to flow from the pump 4 through the pipe line 23, the resilient hose connection 24, which acts as a pulsation absorber or alleviator owing to the fact that it may expand radially when subjected to pulsations of the liquid being pumped therethrough. The water continues to flow through the pipe 25 to the generator heating coil 5 within the shell 26, and is discharged from the coil 5 through the pipe 27, the restricted orifice 6, the flexible hose 28, the spray gun 7 from whence it is discharged through the nozzle 29 when the spray gun shutoff valve 30 is open. The generator heating coil may be drained by means of the drain valve 31 connected at the lowermost position of the pipe 25.

The chemical solution or spray compound is made up in the tank 32 adjacent the shell 26 of the generator. This tank may be drained by a suitable plug such as shown at 33. Near the bottom of the chemical solution tank 32 an outlet strainer 34 is provided through which the chemical flows through the pipe line 35, the check valve 36, the metering valve 37, and the pipe line 38 to the mixing chamber 18 between the check valves 17 and 21 of the pump 4. The chemical is mixed with the conveyor liquid or water in the chamber 18 and provides a spraying solution which when forced through the heating coil 5 of the generator and heated by the burner 40, is transformed into a spray mixture composed of a liquid and the vapor of a liquid. The stem of the metering valve 37 is provided with a V-shaped orifice which has a greater resistance to flow in one direction than in the other and is effective in assisting to maintain a liquid column in the pipe line 35, when the solution tank 32 becomes empty, so as to prevent air being drawn into the pump 4 and reducing its capacity.

Fuel for the burner 40 is contained within the fuel supply tank 41 and is withdrawn therefrom through the pipe 42, the strainer 43, to the fuel pump 44 wherein it passes through the inlet check valve 45 to the fuel pump chamber 46 and is discharged through the spring loaded check valve 47, the pipe line 48, the metering valve 49, the pipe line 50, the flexible hose 51 and the pipe line 52 to the jet of the burner 40 from whence it is mechanically atomized and discharged into the combustion chamber 53 directly below the generating heating coil 5.

The flexible hose 51 is an alleviator and when properly wound with reinforcing cords, consisting of a suitable fabric braided to cross one another with an included angle less than forty-five degrees, provides a pulsation absorber or an alleviator that expands longitudinally and not radially. This hose alleviator functions, when the pump is suddenly stopped, to force a final fuel slug under pressure out of the burner nozzle under the same pressure as that required to mechanically atomize the fuel, thereby transmitting a final discharge effort to the fuel discharged through the burner jet suddenly, stopping all subsequent flow of fuel, to prevent the fuel from dribbling and producing soot and smoke.

A constant pressure is maintained on the fuel fed to the burner by a fuel by-pass which is connected with the fuel pump chamber 46 and is provided with a check valve 54 that permits the fuel to flow from the fuel pump chamber 46 through the restricted orifice 55 and return through the pipe line 56 to the fuel tank 41. By properly adjusting the restricting orifice 55, the pump 44 in conjunction with the action of the alleviator 51 is regulated to produce the desired constant fuel supply pressure to the burner. The metering valve 49 merely varies the amount of fuel supplied to the burner.

The plunger 57 of the solution pump 4 and the plunger 58 of the fuel pump 44 are integrally joined. A connecting rod 59 is pivotally connected at one end to the pistons 57 and 58 of the solution pump and the fuel pump and its other end to the wrist pin 60 of the crank wheel 61 which in turn is driven by means of the belt 62 from the constant speed prime mover electric motor 63.

The motor 63 is also provided with an impeller or fan 64 arranged to produce a draft of air within the conduit 65 which is discharged upwardly through the throat 66 around the burner 40 and into the combustion chamber.

The motor 63 is energized from a suitable source of electric current into which the plug 67 is inserted. When the thermal overload equipped hand switch 68 is closed, current flows through the wire 69, the mercury switch 70, the wire 71 to the motor 63 and returns through the wire 72 to the other side of the electric current supply.

The wire 69 also energizes the continuous spark generating transformer 73, the other end of the primary of which is connected through the wire 72 to the other side of the electric current supply. One side of the high voltage secondary of the spark generating transformer 73 is grounded to the apparatus and current flows continuously from the other side of the secondary through the wire 74 to the spark plug 75, the electrode 76 which is placed sufficiently close to the air deflector of the burner jet so as to produce a constant spark therebetween for lighting and maintaining the ignition of the fuel at all times.

The operation of the spray generating apparatus is regulated by means of the control valve 78 which is provided with a plunger 79 biased to move in one direction by the spring 80 and having a stem 81 connected therewith and arranged to strike the pivoted support 82 of the mercury switch 70 for the purpose of opening the circuit of the motor 63 to interrupt the supply of solution and fuel to the generator when the plunger 79 is subjected to a predetermined maximum pressure. The outlet pipe 23 of the pump 4 of the generating system is connected to the chamber 83 of the control valve 78. The pressure of the generating system is transmitted to the chamber 83 and through the restricted orifice 84 into the chamber 85 and is effective on the piston 79 operating therein. Since the solution pulsates due to the action of the pump 4 the piston 79 is caused to oscillate and thus becomes sensitive to slight variations in pressure even though it has packing friction. In order to control the pulsation between the chambers 83 and 85 within the control valve 78, the control line 86 is connected between the chamber 85 and the generator outlet line 27. The piston 79 is preferably made hollow so that it may contain the head of the relief valve 87 and the spring 88 which maintains the relief valve in the lowermost position or seated on the valve seat 89. When the pressure of the generator system effective on the piston 79 causes it to be retracted from the chamber 85, it will move until the piston stem 81 engages the pivoted support 82 tilting the mercury tube switch 70 and opening the circuit of the motor 63 thus stopping the supply of solution and fuel to the generator.

Further retraction of the piston 79 due to higher pressure from the chamber 85 causes the lost motion between the piston 79 and relief valve 87 to be taken up after which the valve 87 is raised from the seat 89 permitting the solution to by-pass from the pipe 23 through the chamber 83, the valve seat 89 and the tank 32, in order to prevent excessive pressure in the system.

If the flow regulator 3 is removed from the circuit when no vapor pressure exists in the system, such as when starting the apparatus, water under high pressure will flow from the tap 1 through the pump and the heating coil and out the open spray gun in an amount that will exceed the capacity of the system to utilize the water supplied. However with the flow regulator in the system the amount of water flowing will be controlled by the resistance to flow of the liquid, and will not exceed the amount required to correlate it with the fuel supplied to the burner even though the capacity to supply liquid is greater than the capacity of the metering pump 4. The flow regulator 3 is therefore required to limit the amount of water supplied per unit of time in order to generate the spray mixture of liquid and vapor of a liquid when correlated with the capacity of the heating coil and the fuel supplied to the burner.

In order to draw the chemical solution from the tank 32 it is necessary to establish two hydraulic columns, the first column is in the water line from the flow regulator 3 to the mixing chamber 18 and the second column is in the chemical solution supply line from the check valve 36 through the metering valve 37 to the mixing chamber 18. It is also necessary to provide a pulsating flow of liquid to the system which is obtained by the single acting plunger pump 4 driven at a constant speed.

The lengths of the hydraulic columns must be so proportioned relative to each other to enable their predetermined effective hydraulic characteristics to operate in conjunction with the pulsating pump and provide a predetermined flow from the chemical solution tank to the mixing chamber 18 and continue through the pump to the heating coil.

Since the flow regulator 3 may provide a constant flow of water at a predetermined pressure through the first column to the pump at a rate greater than the pump capacity but correlated with the resistance to flow through the system and also within the limits permitting the correlated supply of heat to produce the proper spray mixture of liquid and vapor of a liquid, the power stroke of the pump plunger closes the inlet check valve 21 but the water in the first column is in motion and its hydraulic ram pressure is effective on the chemical solution in the second column. The check valve 36 prevents any reverse flow of solution or water to the tank 32. The check valve 36 thus stops the motion of the liquid in the first column before the pump plunger completes its power stroke.

When the pump plunger reverses and commences its suction stroke the inlet check valve 21 opens and both hydraulic columns are subjected to the initial suction but the liquid making up the first or water column offers a greater resistance to movement than the second or chemical solution column, even though the first column is subjected to a pressure at the flow regulator 3, because the water column is made effectively longer than the chemical solution column. This results in the suction forces of the pump being effective in first drawing the chemical solution in the effectively shorter or second column as this column has materially less resistance to movement owing to its hydraulic characteristics, and the check valve 36 opens to replenish the second column with an amount of liquid equal to that withdrawn by the pump, thus maintaining the second column full of liquid. However before the pump piston travels very far on its suction stroke, the pressure on the water column has had an opportunity to overcome its resistance to flow resulting in the flow of water into the pump chamber until the plunger reaches the end of its power stroke which completes a pumping cycle. The plunger again reverses and starts to move on its power stroke at which time the inlet check valve again closes stopping further flow of liquid to the pump. This pumping cycle is repeated to provide a rapid intermittent or pulsating flow of chemical solution and water to the heating coil.

To provide the proper amounts of chemical solution and water to the system during each pumping cycle it is necessary to properly proportion the two hydraulic columns so that their resistance to movement coupled with the capacity and pulsations of the pump are tuned to function together and supply both liquids in the desired metered quantities.

Again the effective pressure on the water in the first column must be lower than that developed during the power stroke of the pump and also lower than the pressure developed in generating the spray mixture of liquid and vapor of a liquid to prevent forcing water through the system and causing an unbalance in the feed of liquid and heat.

If the chemical solution tank 32 happens to become sufficiently low to permit the first bubble of air to be drawn through the pipe 35 and past the check valve 36 it will become trapped in the second column. Upon the next power stroke of the pump 4 the inlet check valve 21 closes and the momentum of the water in the first column compresses this trapped air and produces a surge that dies down before the pump completes its power stroke. When the pump plunger reverses the suction of the pump attempts to draw the second column as before but the compressed entrapped air expands and only that portion of the column beyond the air bubble will move but will not flow and the suction forces are not sufficient to draw any more air from the chemical solution tank and the liquid thus remains in the pipe 35 and the second column. The first column is then required to deliver all the liquid to the system. Thus the chemical solution column between the pump and the air bubble becomes air-bound and it merely oscillates back and forth due to alternate application of the hydraulic pressure ram action of the liquid in the first column and the suction forces of the pump and the action of the V-shaped groove in the metering valve stem which creates a greater fluid resistance in a direction that prevents emptying the column with the result that the chemical solution remaining in the column is not fed to the pump. Thus with properly balanced chemical solution and water columns the passage of air to the pump is prevented and the heating coils are prevented from becoming burned out.

In order for the system to function the effective hydraulic action of the second column must be at least equal to that of the first column to obtain a flow of the chemical solution or the first column must be able to resist suction to permit the second column to flow a predetermined amount. Thus a balance must be made to properly proportion these hydraulic columns with each other and with the rest of the system.

I claim:

1. The method of producing a spray mixture of liquid and vapor of a liquid under pressure in a generator having a characteristic resistance to the flow of liquid therethrough which consists in, providing a column continuously supplied with a liquid under a predetermined pressure, providing a second column supplied with a liquid chemical spray solution, restricting the flow of the liquid spray solution, proportioning the columns relative to each other and to the resistance to flow through the generator, metering a spray solution from both columns to the generator, and applying heat to the metered spray solution to produce the spray mixture under pressure.

2. The method of producing a spray mixture of liquid and vapor of a liquid under pressure consisting of, providing a column continuously supplied with water under a selected pressure, providing a second column capable of flowing in one direction only and supplied with a liquid chemical solution, restricting the flow of the liquid chemical solution, metering liquid from both columns by pulsating flow to a heating zone, proportioning the columns to provide predetermined quantities of water and chemical solution in the metered spray solution, and applying a heat to the spray solution in the heating zone in an amount correlated with the amount of spray solution supplied to generate the spray mixture.

3. In a generator for producing a spray mixture of liquid and the vapor of a liquid comprising, a continuous tube heat exchanger having a discharge spray gun, means providing a pulsating flow to meter a spray solution to the heat exchanger, a column to connect a liquid supply to said metering means, means for supplying heat to the heat exchanger in an amount correlated to the supply of liquid to produce a spray solution, and a flexible diaphragm regulator to supply the liquid to the column under a pressure proportional to the resistance to the flow of liquid through the metering means and the heat exchanger with the spray gun open.

4. In a generator for producing a spray mixture of liquid and the vapor of a liquid comprising, a continuous tube heat exchanger having a discharge spray gun, means providing a pulsating flow to meter a spray solution to the heat exchanger, means to supply a liquid under a pressure proportional to a pressure determined by the resistance to the flow of liquid through the metering means and the heat exchanger with the spray gun open, a column of predetermined length connecting said liquid supply means to the metering means, the length of the column being selected to provide an inertia of liquid that is greater in pressure than the selected pressure supply, a second column connecting a flow restricting metering valve controlling the supply of a source of chemical solution to the metering means to form a spray solution with the liquid supplied therewith, said columns being proportioned relative to one another, and means for supplying heat to the heat exchanger in an amount correlated with the amount of metered spray solution for heating the spray solution under pressure.

5. In a generator for producing a spray mixture of liquid and the vapor of a liquid comprising, a continuous tube heat exchanger having a discharge spray gun, a positive displacement pump to meter a spray solution to the heat exchanger, a column of predetermined length to connect a liquid supply to said metering pump, a flexible diaphragm regulator to supply liquid to the column under a pressure proportional to a pressure determined by the resistance to flow of liquid through the column and the metering pump and the heat exchanger with the spray gun open, the length of the column being selected to provide an inertia of liquid that is greater in pressure than the selected pressure supply, a second column connecting a flow restricted metering valve controlling the supply of source of chemical solution to the metering pump to form a spray solution with the liquid supplied therewith, said columns being proportioned relative to another, and means for supplying heat to the heat exchanger in amount correlated with the amount of metering spray solution for heating the spray solution under pressure.

6. The method of producing a spray mixture of liquid and the vapor of a liquid under pressure in a continuous tube spray generator capable of developing a predetermined back pressure due to the resistance to flow of fluid therethrough, which comprises utilizing the resistance to flow to control the pressure of liquid supplied to the generator, supplying liquid to the generator through a column, supplying chemical solution to the generator through a metering restriction, metering by pumping the liquid and chemical solution to the generator, selecting the length of the column to proportion the amount of the liquid and chemical solution and provide sufficient inertia of the liquid column therein to develop a suction on the chemical solution and feed it through the metering restriction, and heating the spray solution to produce the spray mixture.

FRANK W. OFELDT.

REFERENCES CITED

The following references are of record in the file of this patent:

UNITED STATES PATENTS

| Number | Name | Date |
| --- | --- | --- |
| 2,044,557 | Alvord | June 16, 1936 |
| 2,062,925 | Ofeldt | Dec. 1, 1936 |
| 2,128,263 | Ofeldt | Aug. 30, 1938 |
| 2,345,614 | Malsbary et al. | Apr. 4, 1944 |